US005767524A

United States Patent [19]
Barbier et al.

[11] Patent Number: 5,767,524
[45] Date of Patent: Jun. 16, 1998

[54] OPTICAL DEVICE FOR DETERMINING THE ORIENTATION OF A SOLID BODY

[75] Inventors: Bruno Barbier; Patrick Lach, both of Bordeaux, France

[73] Assignee: Sextant Avionique, Velizy Villacoublay, France

[21] Appl. No.: 708,828

[22] Filed: Sep. 9, 1996

[30] Foreign Application Priority Data

Sep. 8, 1995 [FR] France ................ 95 10532

[51] Int. Cl.⁶ ............................ G01N 21/86
[52] U.S. Cl. .................. 250/559.29; 250/206.2; 345/8
[58] Field of Search ............ 250/559.29, 559.32, 250/203.2, 203.3, 206.2, 206.1; 356/141.5, 141.4, 28, 375; 345/7, 8; 340/980

[56] References Cited

U.S. PATENT DOCUMENTS

| | | | |
|---|---|---|---|
| 4,396,885 | 8/1983 | Constant | 324/207.18 |
| 4,459,542 | 7/1984 | Terrier et al. | 324/77 |
| 5,053,764 | 10/1991 | Barbier et al. | 340/793 |
| 5,057,744 | 10/1991 | Barbier et al. | 315/10 |
| 5,239,293 | 8/1993 | Barbier et al. | 340/784 |
| 5,296,854 | 3/1994 | Hamilton et al. | 340/980 |
| 5,313,054 | 5/1994 | Lach et al. | 250/206.2 |
| 5,440,114 | 8/1995 | Barbier et al. | 250/206.2 |
| 5,455,586 | 10/1995 | Barbier et al. | 342/37 |
| 5,479,279 | 12/1995 | Barbier et al. | 359/53 |
| 5,534,689 | 7/1996 | Barbier et al. | 250/206.2 |

FOREIGN PATENT DOCUMENTS

| | | |
|---|---|---|
| 0 155 858 | 9/1985 | European Pat. Off. |
| 2 634 015 | 1/1990 | France . |
| 2 061 548 | 5/1981 | United Kingdom . |

OTHER PUBLICATIONS

V.S. Doroshuk, et al., "Electron-Optic Device For Controlling Surface Position Deviations in Body-Type Parts", Factory, Institute, and Design-Office Practice, 1323 Russian Engineering Research 13(1993) No. 4, New York, US, p. 74, Jan. 1993.

Primary Examiner—Que Le
Attorney, Agent, or Firm—Oblon, Spivak, McClelland, Maier & Neustadt, P.C.

[57] ABSTRACT

A device determining the orientation of a first solid body with respect to a second or reference solid body. Each body is filled with sets consisting of an optical source and a detector of optical radiation, so as to define at least two straight lines having a direction $\vec{u}$ and $\vec{v}$ joining two pairs of sources ($S_{mi}$, $S_{fj}$), the sources ($S_{mi}$) relating to the first solid body and the sources ($S_{fj}$) relating to the reference solid body. The device includes means to compute the parameters of orientation of the first solid body with respect to the reference solid body from the coordinates of the vectors $\vec{u}$ and $\vec{v}$. Applications: Determining the orientation of a helmet of the pilot of an aircraft or helicopter with respect to a cockpit.

10 Claims, 3 Drawing Sheets

OPTICAL DEVICE FOR DETERMINING THE ORIENTATION OF A SOLID BODY

BACKGROUND OF THE INVENTION

1. Field of the Invention

The present invention relates to a device for determining the orientation of any solid body in a given space.

Many systems need to know and carry out the almost real-time tracking of the progress of the parameters of orientation of a solid body in a given referential system. This is especially the case with visor systems that are mounted on the very helmet of aircraft pilots or helicopter pilots and enable pilots to see the image of a reticle projected to infinity superimposed on the external scene. It is imperative that the images shown to the pilot should correspond to the referential system of the carrier (the aircraft or helicopter) whatever may be the motions of the helmet with respect to this carrier, so as to provide a weapons system with a designation, for example, of a target being aimed at.

2. Description of the Prior Art

There are known ways of using an electromagnetic position and orientation detector comprising, firstly, a transmitter that is fixed in the given referential system consisting of three coils excited alternately by a generator and, secondly, a sensor fixed to the solid body and also having three coils so that, to each position of the solid body, there correspond nine signals induced by the coils of the transmitter, these nine signals enabling the computation of the position and orientation of the solid body. However, the electromagnetic fields created or induced may be disturbed in particular because of all the surrounding metal elements, and a detector of this kind makes it necessary either to have available ancillary means to provide a reference signal with a view to carrying out a correction (French patent N. 2 655 415) or to carry out, in a preliminary phase, a modelling operation that takes account of the disturbances.

There also exist electro-optical systems consisting of the positioning, on the solid body, of a certain number of surface or localized marks, that may or may not be emitting marks, whose position in a referential system Rm related to the solid body is well known and then of the identifying, by optical sensors fixed in the referential system Rf of the measuring space, of the position of a certain number of straight lines or curved lines connecting at least two distinct marks of the solid body. It can be shown that the measurement error of the parameters of orientation of the solid body is firstly proportional to the uncertainty of the position measurements of the marks in the referential system Rf and secondly inversely proportional to the distance between the marks. Systems of this kind are therefore rather adapted to large-sized solid bodies for which the marks may be greatly spaced out but the measurements always require the computation of the position of at least two points of the solid body.

To do away with the need to determine a position that is not necessary to determine the orientation, one approach has been proposed in the published patent application No. 2 683 036 filed on behalf of the present Applicant. This approach entails using radiation sources collimated on the moving body and directional sensors in a fixed referential system.

As a result, the direction of the radiation detected by a directional sensor is independent of the position of the moving body.

The orientation of the solid body is entirely determined by the knowledge of the orientation of the two fixed directions of the moving body.

However, this approach makes it necessary to have permanent visibility of at least two sources collimated by two sensors. This implies a great quantity of collimated sources and/or direction sensors or else again large-sized collimated sources.

SUMMARY OF THE INVENTION

In this context, to determine the orientation of a solid body independently of the position of said solid body, with high precision and with the use of compact means, an object of the invention is an optical device for determining the orientation of a referential system Rm related to a first solid body with respect to a referential system Rf related to a second solid body called a reference solid body, wherein:

the first solid body comprises at least one set consisting of an optical source $S_{mi}$ and an optical radiation detector $C_{mi}$;

the reference solid body comprises at least one set consisting of an optical source $S_{fj}$ and an optical radiation detector $C_{fj}$;

the optical sources $S_{mi}$ and $S_{fj}$ are conjugate with or superimposed on the centers of the field diaphragms with which the optical radiation sensors are equipped;

at least one of the first solid body or the reference solid body comprises at least two sets so as to define at least two straight lines having a direction $\vec{u}$ and $\vec{v}$ joining two pairs of sources $(S_{mi}, S_{fj})$;

the optical device has means to compute parameters for the orientation of the referential system Rm with respect to the referential system Rf from the co-ordinates of the vectors $\vec{u}$ and $\vec{v}$ determined both in the referential system Rm and in the referential system Rf.

The determining of the orientation of the first solid body with respect to the referential system Rf requires the measurement of the orientation of at least two distinct directions as in the patent application No. 2 683 036 referred to. However, according to the invention, each of the directions is fixed neither in the referential system Rf nor in the referential system Rm. Each of the directions is that of a straight line measured both in the referential system Rm and in the referential system Rf.

The knowledge of the orientation of at least two distinct straight lines in each of the referential systems gives, by computation, the three parameters of orientation of the first solid body with respect to the referential system Rf.

It may be noted that a major difference with the prior art lies in the light sources which are no longer collimated but omnidirectional. Thus, an entire range of directions of optical radiation emitted by a source $S_{mi}$ is likely to be detected by a detector $C_{fj}$ and reciprocally by a source $S_{fj}$ with respect to a detector $C_{mi}$, during the change in orientation of the first solid body with respect to the reference solid body.

In the device according to the invention, the optical sources $S_{mi}$ and $S_{fj}$ are conjugate with the centers of the field diaphragms with which the optical radiation sensors are equipped. In a configuration of this kind, the relative position of a source $S_{mi}$ ($S_{fj}$) with respect to the associated direction sensor $C_{mi}$ ($C_{fj}$) is such that all the directions measured are those of the straight line passing through the source $S_{mi}$ ($S_{fj}$).

More specifically, the direction of the source $S_{fj}$ measured by the sensor $C_{mi}$ is that of the straight line joining the source $S_{fj}$ to the source $S_{mi}$. Similarly, the direction of the source $S_{mi}$ measured by the sensor $C_{fj}$ is that of this same straight line joining the two sources $S_{fj}$ and $S_{mi}$.

It follows that the sensors $C_{mi}$ and $C_{fj}$ measure the direction of the same straight line separately.

In the device according to the invention, this operation is performed simultaneously at least twice between the first solid body and the reference solid body so as to simultaneously define the direction of two straight lines.

The sensors of the device according to the invention may advantageously be surface sensors or linear arrays of sensors with the appropriate associated field diaphragms.

In the exemplary application pertaining to visor systems fitted into pilot helmets, the reference solid body may be the cockpit of the aircraft in which the pilot is located, the first solid body being the pilot's helmet itself.

BRIEF DESCRIPTION OF THE DRAWINGS

The invention will be understood more clearly and other advantages shall appear from the following description and the appended drawings, of which:

FIG. 1 gives a schematic view of the detection of a source $S_{fj}$ by a surface sensor $C_{mi}$;

MORE DETAILED DESCRIPTION

By the determining of two straight lines pertaining to directions of radiation coming from the two referential systems Rm and Rf, the device according to the invention can be used to determine the orientation of the first solid body without requiring additional measurements of position and makes it possible to remove the need for measurements by triangulation as is conventionally the case. On this very same basis, the precision on the measurement of orientation does not depend on the precision of a position measurement.

In using sources that may be point sources and omnidirectional, it is possible to have available a piece of equipment that is small-sized and can therefore be easily integrated, especially into a helmet.

A description shall now be given of the principle of operation of the device according to the invention, in the case of a device using surface detectors of optical radiation.

Figure 1:
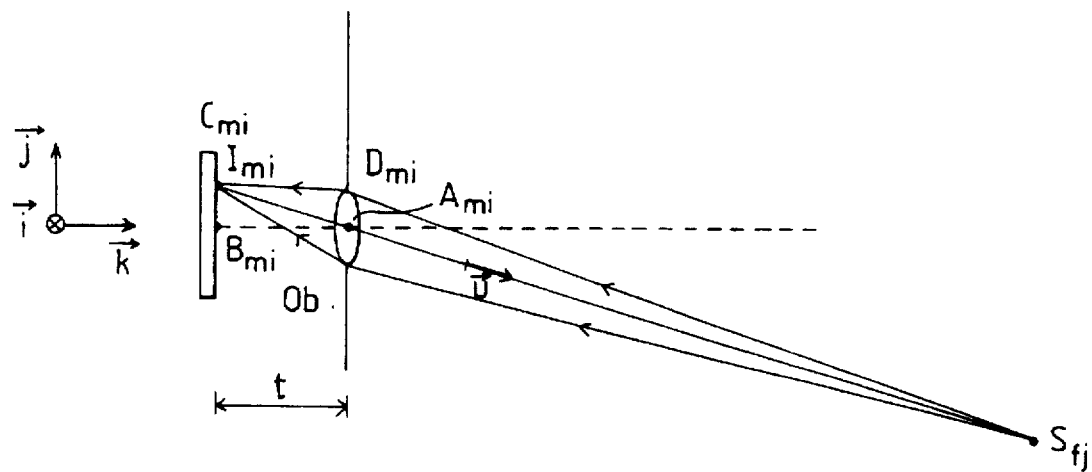
FIG. 1 shows an exemplary embodiment for determining the orientation of a solid body according to the prior art.

FIG. 1 illustrates the detection by a detector $C_{mi}$ fitted out with a diaphragm $D_{mi}$, in the referential system Rm, of a source $S_{fj}$ located in the referential system Rf. Since the source $S_{fj}$ is omnidirectional, a part of its radiation is necessarily intercepted by the sensor $C_{mi}$ separated from the diaphragm that is associated with it by a distance t. The sensor $C_{mi}$ may advantageously be fitted out with a device for focusing the energy so as to focus the energy of the optical radiation coming from the source $S_{fj}$ as efficiently as possible on the sensor $C_{mi}$, thus enabling an increase in the sensitivity of the sensor.

Figure 2:
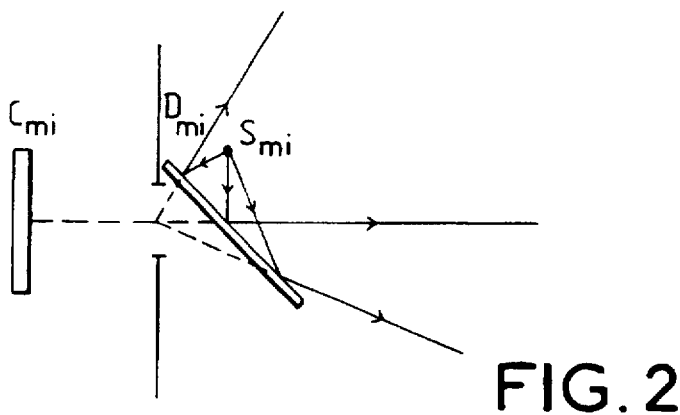
FIG. 2 gives a schematic view of a set formed by a source $S_{mi}$ and an associated sensor $C_{mi}$ comprising a semi-reflecting mirror.

FIG. 2 pertains to a set formed by the sensor $C_{mi}$/source $S_{mi}$, wherein the image of the source is at the center of the diaphragm. It is possible indeed to move the source $S_{mi}$ away from the diaphragm by using a semi-reflecting type of mirror capable of reflecting the light flux coming from the source $S_{mi}$ and transmitting the light flux coming from a source $S_{fj}$ located in the referential system Rf.

Figure 3:
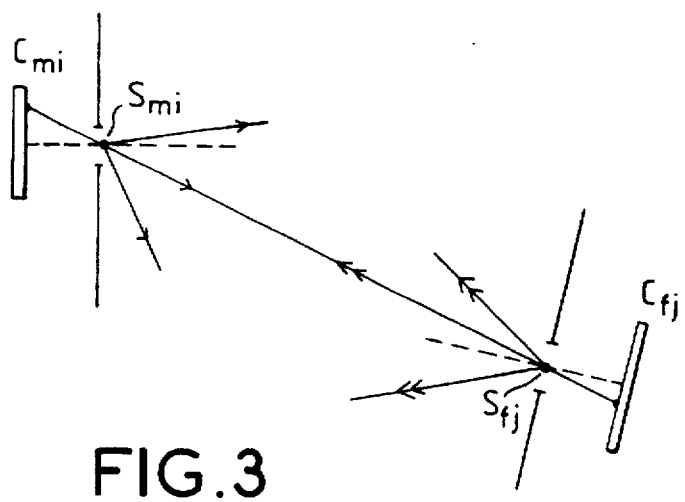
FIG. 3 illustrates an exemplary direction of optical radiation coming both from the sources $S_{mi}$ and $S_{fj}$ and detected by the sensors $C_{mi}$ and $C_{fj}$.

FIG. 3 shows an exemplary direction of optical radiation coming both from the sources $S_{mi}$ and $S_{fj}$ and detected by the sensors $C_{mi}$ and $C_{fj}$.

In the first solid body, an orthonormal referential system Rm is defined, this referential system consisting of three unitary vectors $(\vec{i}, \vec{j}, \vec{k})$ $\vec{i}$ and $\vec{j}$ defining the two orthogonal directions of reference of the plane of the surface sensor, $\vec{k}$ being relative to the normal to the plane of the sensor. On each sensor $C_{mi}$, the position $I_{mj}$ of the center of the illumination spot coming from a source $S_{fj}$ is thus given by its x and y co-ordinates in the plane of the sensor $C_{mi}$ with respect to the center $B_{mi}$ of the sensor $C_{mi}$ (as shown in FIG. 1). The direction of the source $S_{fj}$ is given by the orientation of the straight line $I_{mi}A_{mi}$ if $A_{mi}$ is the center of the diaphragm $D_{mi}$ associated with the sensor $C_{mi}$. The components of the vector $I_{mi}A_{mi}$ with respect to the referential system $(\vec{i}, \vec{j}, \vec{k})$ are thus (x, y, t).

The components of the unitary vector $\vec{u}$ giving the orientation of the straight line $I_{mi}A_{mi}$ are therefore with reference to this referential system:

$$a_{mi}=x/(x^2+y^2+t^2)^{1/2}$$

$$b_{mi}=y/(x^2+y^2+t^2)^{1/2}$$

$$c_{mi}=t/(x^2+y^2+t^2)^{1/2}$$

Similarly, it is possible to define the orientation of the straight line $I_{fj}A_{fj}$ if $A_{fj}$ is the center of the diaphragm $D_{fj}$ associated with the sensor $C_{fj}$ and $I_{fj}$ the position of the center of the illumination spot coming from the source $S_{mi}$.

The identical straight lines $I_{mi}A_{mi}$ and $I_{fj}A_{fj}$ may therefore be defined in the referential system Rm by co-ordinates ($a_{mi}$, $b_{mi}$, $c_{mi}$) and in the referential system Rf by co-ordinates ($a_{fj}$, $b_{fj}$, $c_{fj}$).

Figure 4:
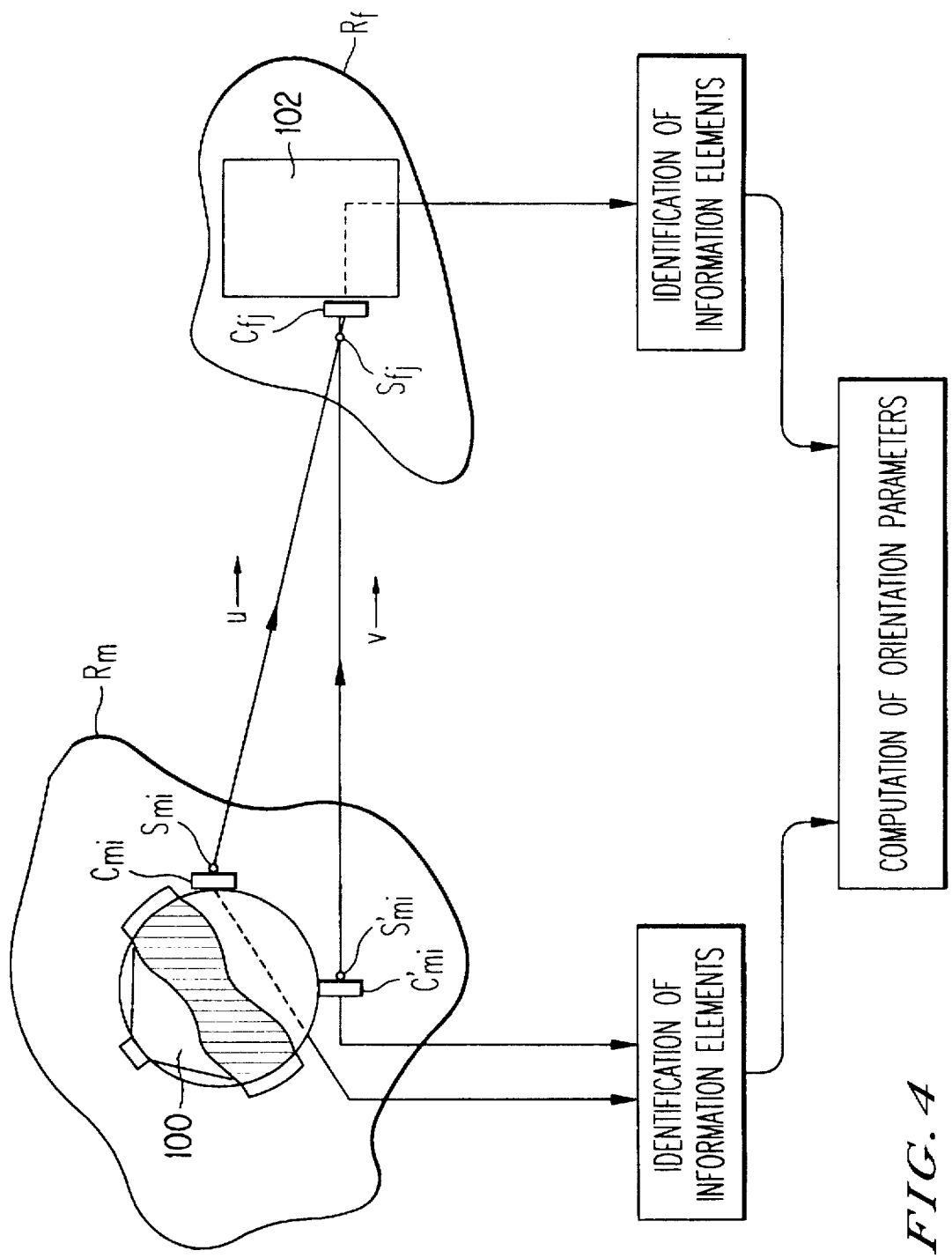
FIG. 4 gives a schematic view of the referential systems Rm and Rf, the referential system Rm being provided with two sets to receive directions of light radiation along the vectors $\vec{u}$ and $\vec{v}$ as indicated.

Since, according to the invention, the device comprises, in at least one referential system, two source/detector sets, for example, in the referential system Rm, two sets ($S_{mi}$, $C_{mi}$) and ($S'_{mi}$, $C'_{mi}$) as shown in FIG. 4, it is possible to define at least one other unitary vector $\vec{v}$ giving the orientation of a straight line $I'_{mi}A'_{mi}$.

FIG. 4 illustrates a first solid body 100, a helmet for example, related to the Rm referential system having the above described two source-detector sets. A second solid body 102, an aircraft cockpit for example, also referred to as a reference solid body and related to the Rf referential system having a single source/detector set is also illustrated.

Each sensor transmits the information elements that it collects, all these information elements being processed to define the orientation parameters of one referential system with respect to the other.

For the detailed computation, the co-ordinates of the unitary vector $\vec{v}$ in the referential system Rm will be denoted as ($a'_{mi}$, $b'_{mi}$, $c'_{mi}$) and the co-ordinates of this unitary vector in the referential system Rf will be denoted as ($a'_{fj}$, $b'_{fj}$, $c'_{fj}$).

On the basis of the vectors $\vec{u}$ and $\vec{v}$ known in the two referential systems, it is possible to define the unitary vector $\vec{w}$ perpendicular to the plane defined by the vectors $\vec{u}$ and $\vec{v}$, $\vec{w} = \vec{u} \wedge \vec{v}$ ($\wedge$ designating the vector product).

The co-ordinates of the vector $\vec{w}$ in the referential system Rm are thus given by the following equations:

$$A_{mi} = b_{mi} \cdot c'_{mi} - b'_{mi} \cdot c_{mi}$$

$$B_{mi} = c_{mi} \cdot a'_{mi} - c'_{mi} \cdot a_{mi}$$

$$C_{mi} = a_{mi} \cdot b'_{mi} - a'_{mi} \cdot b_{mi}$$

Similarly, the components of the vector $\vec{w}$ in the referential system Rf can be defined by the following equations:

$$A_{fj} = b_{fj} \cdot C'_{fj} - b'_{fj} \cdot C_{fj}$$

$$B_{fj} = C_{fj} \cdot a'_{fj} - c'_{fj} \cdot a_{fj}$$

$$C_{fj} = a_{fj} \cdot b'_{fj} - a'_{fj} \cdot b_{fj}$$

The vector $\vec{v}'$ belonging to the plane defined by the vectors $\vec{u}$ and $\vec{v}$ and perpendicular to the vector $\vec{u}$ is then introduced. This vector perpendicular to $\vec{u}$ and to $\vec{w}$ is given by the expression $\vec{v}' = \vec{w} \wedge \vec{u}$.

The components of the vector $\vec{v}'$ in the referential system Rm are therefore given by the following equations:

$$A'_{mi} = B_{mi} \cdot c_{mi} - b_{mi} \cdot C_{mi}$$

$$B'_{mi} = C_{mi} \cdot a_{mi} - c_{mi} \cdot A_{mi}$$

$$C'_{mi} = A_{mi} \cdot b_{mi} - a_{mi} \cdot B_{mi}$$

The components of the vector $\vec{v}'$ in the referential system Rf are therefore also given by the following equations:

$$A'_{fj} = b_{fj} \cdot C_{fj} - b_{fj} \cdot C_{fj}$$

$$B'_{fj} = C_{fj} \cdot a_{fj} - c_{fj} \cdot A_{fj}$$

$$C'_{fj} = A_{fj} \cdot b_{fj} - a_{fj} \cdot B_{fj}$$

The 3×3 matrix whose columns are the components of the vectors $\vec{u}$, $\vec{v}'$ and $\vec{w}$ in the referential system Rm has the following expression:

$$[M_{mi}] = \begin{bmatrix} a_{mi} & A'_{mi} & A_{mi} \\ b_{mi} & B'_{mi} & B_{mi} \\ c_{mi} & C'_{mi} & C_{mi} \end{bmatrix}$$

The 3×3 matrix the columns of which are the components of the vectors $\vec{u}$, $\vec{v}'$ and $\vec{w}$ in the referential system Rf has the following expression:

$$[M_{fj}] = \begin{bmatrix} a_{fj} & A'_{fj} & A_{fj} \\ b_{fj} & B'_{fj} & B_{fj} \\ c_{fj} & C'_{fj} & C_{f} \end{bmatrix}$$

The matrix of rotation sought [R] which expresses the rotation of the solid body (1) related to Rm with respect to the reference solid body related to Rf, also links the components of the vectors $\vec{u}$, $\vec{v}'$ and $\vec{w}$ in the fixed referential system Rf to the components of these same vectors in the referential system Rm.

Thus $[M_{fj}] = [R] \cdot [M_{mi}]$

Or again $[R] = [M_{fj}] \cdot [M_{mi}]^{-1}$

The matrix $[M_{mi}]^{-1}$, which is the reverse of the matrix $[M_m]$ is also its transpose. More specifically, the expression of the matrix [R] sought is:

$$[R] = \begin{bmatrix} a_{fj} & A'_{fj} & A_{fj} \\ b_{fj} & B'_{fj} & B_{fj} \\ c_{fj} & C'_{fj} & C_{fj} \end{bmatrix} \cdot \begin{bmatrix} a_{mi} & b_{mi} & c_{mi} \\ A'_{mi} & B'_{mi} & C'_{mi} \\ A_{mi} & B_{mi} & C_{mi} \end{bmatrix}$$

Thus, from the positions of illumination of the sources associated with the referential system Rf, on the plane sensors $C_{mi}$ associated with the referential system Rm, it is possible to determine the orientation of the first solid body 100 moving with respect to the reference solid body 102 which may also be moving. In particular, it is possible to determine the orientation of a pilot's helmet, fitted out with sources and sensors ($S_{mi}$, $C_{mi}$), in relation to the cockpit itself fitted out with sources and sensors ($S_{fj}$, $C_{fj}$).

Typically, the surface sensors used may advantageously be spatially discontinuous: they may be constituted by a mosaic of photosensitive elements that are evenly spaced out and aligned in a matrix structure in rows and columns.

These sensors cyclically deliver an electrical (video) signal successively proportional to the illumination of each photosensitive element and integrated for a given duration. It may be a matrix of CCD (charge-coupled device) photosensors.

The knowledge of the profile, even in a context of spatial sampling, of the illuminated zone on the sensor enables the computation of the position of the center of this illuminated zone with a higher precision than that of the pitch between photosensitive elements.

The light sources may advantageously be light-emitting diodes (emitting for example in the infrared) and their radiation may be made undetectable or easily capable of rejection by the associated sensor through the use of a semi-reflective mirror but also through the use of an optical shift in wavelength (the surface sensor is not sensitive to the wavelength put out by the associated source).

It is also possible to use a temporal encoding to ensure the non-detection of a light source by the associated sensor.

The field diaphragm may be formed by a circular hole made in a material opaque to radiation from the point source for which it is sought to measure the direction, with respect to the normal to the photodetection plane for example.

Figure 5:
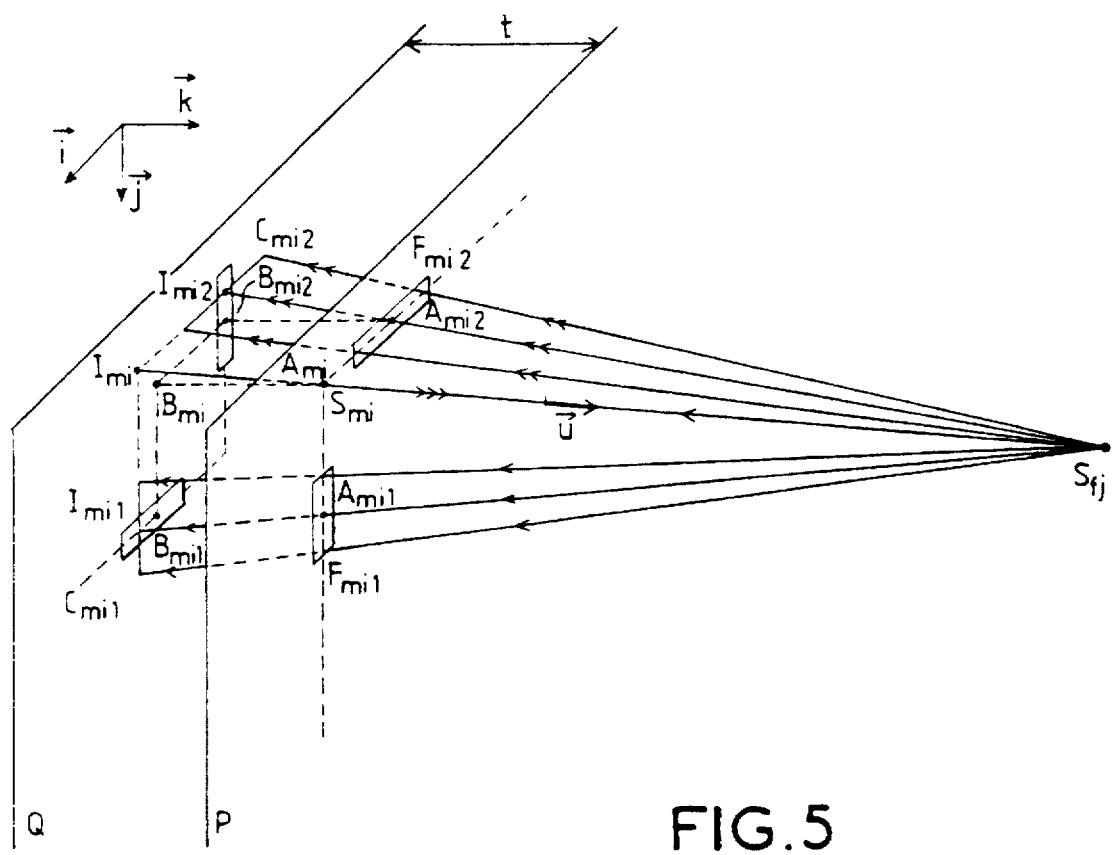
FIG. 5 illustrates an exemplary source/sensor set using a pair of sensors $C_{mi1}$ and $C_{mi2}$ in a linear array.

In a second alternative embodiment, the sensors used are pairs of sensors in linear array. The sets fitted into the referential systems Rm and Rf then each comprise:

two coplanar sensors $C_{mi1}$ and $C_{mi2}$ in a linear array (respectively $C_{fj1}$ and $C_{fj2}$), the axes of which are mutually perpendicular;

two slot-shaped coplanar field diaphragms $F_{mi1}$ and $F_{mi2}$ (respectively $F_{fj1}$ and $F_{fj2}$), the axes of which are mutually perpendicular;

a point source $S_{mi}$ (and $S_{fj}$ respectively) positioned in the plane of the slots at the intersection of the axes of the slots, as shown in FIG. 5.

It can be seen that the plane $P_{mi}$ of the sensors and the plane $Q_{mi}$ of the slots are parallel and at a distance of t from each other in the referential system Rm (the situation is similar in the referential system Rf).

The slots $F_{mi1}$ and $F_{mi2}$ are respectively perpendicular to the sensors $C_{mi1}$ and $C_{mi2}$.

The centers $A_{mi1}$ and $A_{mi2}$ of the slots $F_{mi1}$ and $F_{mi2}$ are positioned on the same normals to the plane $P_{mi}$ as the centers $B_{mi1}$ and $B_{mi2}$ of the sensors $C_{mi1}$ and $C_{mi2}$.

The positions $I_{mi1}$ and $I_{mi2}$ of the centers of the zones illuminated on the photosensors give the planes on which the measured source $S_{fj}$ is located:

the plane coming from $I_{mi1}$ and going through the slot $F_1$
the plane coming from $I_{mi2}$ and going through the slot $F_2$.

To increase the sensitivity of the sensors $C_{mi1}$ and $C_{mi2}$ in a linear array, it is possible to associate focusing objectives $Ob_{mi1}$ and $Ob_{mi2}$ with them, these focusing objectives consisting for example of a cylindrical lens with a focal distance equal to the distance t.

Just as in the variant of the invention using surface sensors, it is possible to define the orthonormal referential system Rm by unitary vectors ($\vec{i}$, $\vec{j}$, $\vec{k}$), two directions of which are defined orthogonally to the axes of the sensors $C_{mi1}$ and $C_{mi2}$ in a linear array and the third direction of which is defined by the normal common to the planes $P_{mi}$ of the sensors and to the plane $Q_{mi}$ of the slots.

The positions $I_{mi1}$ and $I_{mi2}$ of the center of the illumination spots on each sensor $C_{mi1}$ and $C_{mi2}$ are given respectively by their co-ordinates x or y, along the sensor with respect to the center $B_{mi1}$ and $B_{mi2}$ of each sensor.

The direction in which the unknown source $S_{mj}$ is located is given by:

the plane containing the axis of the slot $F_{mi1}$ and the center of the spot $I_{mi1}$;

the plane containing the axis of the slot $F_{mi2}$ and the center of the axis $I_{mi2}$.

The intersection of these two planes is the straight line containing:

the meeting point $A_{mi}$ of the axes of the slots,
the point of intersection $I_{mi}$ between
the straight line passing through the spot center $I_{mi1}$ and parallel to the axis of the slot $F_{mi1}$
the straight line going through the spot center $I_{mi2}$ and parallel to the axis of the slot $F_{mi2}$.

The direction of the unknown source $S_{fj}$ is therefore given by the orientation of the straight line $I_{mi}A_{mi}$ that goes through the meeting point $A_{mi}$ of the axes of the slots. The components of the vector $I_{mi}A_{mi}$ with respect to the referential system ($\vec{i}$, $\vec{j}$, $\vec{k}$) are (x, y, t). The components of the unitary vector $\vec{u}$ giving the orientation of the straight line $I_{mi}S_{fj}$ are therefore, with respect to this referential system, identical to those defined in the framework of surface sensors, namely:

$$a_{mi} = x/\sqrt{x^2+y^2+t^2}$$

$$b_{mi} = y/\sqrt{x^2+y^2+t^2}$$

$$c_{mi} = t/\sqrt{x^2+y^2+t^2}$$

In this variant of the invention, the sources used may also be light-emitting diodes.

The sensors in linear array may also be CCD photosensor arrays.

The advantage of the use of sensors in linear array lies in their working rate, which is faster than that of surface sensors, and in their compactness.

What is claimed is:

1. An optical device for determining the orientation of a referential system Rm related to a first solid body with respect to a referential system Rf related to a second solid body called a reference solid body, comprising:

plural optical source/detector sets, each comprising, an optical radiation detector (C) including a field diaphragm for collecting optical radiation, and an optical source (S) superimposed at a center of said field diaphragm;

at least one of said plural optical source/detector sets ($S_{fj}$, $C_{fj}$) located on said second solid body;

at least two of said plural optical source/detector sets ($S_{mi}$, $C_{mi}$, $S'_{mi}$, $C'_{mi}$) located on said first solid body, thereby defining at least two vectors $\vec{u}$ and $\vec{v}$ corresponding to ($S_{mi}$, $S_{fj}$) and ($S'_{mi}$, $S_{fj}$), respectively; and means to compute an orientation of the referential system Rm with respect to the referential system Rf from coordinates of the at least two vectors $\vec{u}$ and $\vec{v}$ determined both in the referential system Rm and in the referential system Rf.

2. The optical device according to claim 1, wherein:

the optical radiation detectors are surface detectors; and each field diaphragm is parallel to a plane of the surface detector in each corresponding optical source/detector set.

3. The optical device according to claim 2, wherein the optical radiation detectors are spatially discontinuous, of the mosaic type with photosensitive elements.

4. The optical device according to claim 3, wherein the spatially discontinuous radiation detectors are charge-coupled device (CCD) type photosensor matrices.

5. The optical device according to claim 2, wherein the optical sources are point sources positioned at the center of each field diaphragm.

6. The optical device according to claim 2, wherein images of the optical sources are positioned at the center of each field diaphragm, and a semi-reflector type of mirror is positioned between each source and the associated field diaphragm.

7. The optical device according to claim 1, wherein:

each sensor $C_{mi}/C_{fj}$ comprises two linear arrays of elementary sensors $C_{mi1}/C_{mi2}$ and $C_{fj1}/C_{fj2}$;

said linear arrays of elemental sensors being coplanar and having axes that are not parallel with each other;

said linear arrays of elemental sensors being associated with field diaphragms in the form of slots;

each slot being coplanar with and having an axis perpendicular to the axis of the associated sensor array; and the optical sources $S_{mi}/S_{fj}$ are placed at an intersection of the axes of said slots.

8. An optical device according to claim 7, wherein the linear array sensors are linear array type of CCD photosensors.

9. An optical device according to claim 1, wherein the optical sources are light-emitting diodes.

10. An optical device according to claim 1, wherein:

the referential system Rf is the cockpit of an aircraft corresponding to said second solid body and;

the referential system Rm is a helmet corresponding to said first solid body.

* * * * *